United States Patent Office 3,120,531
Patented Feb. 4, 1964

3,120,531
10-BROMOYOHIMBINE ALKALOIDS
John Shavel, Jr., Mendham, and Harold Zinnes, Denville, N.J., assignors to Warner-Lambert Pharmaceutical Company, Morris Plains, N.J., a corporation of Delaware
No Drawing. Filed Sept. 6, 1961, Ser. No. 136,185
3 Claims. (Cl. 260—287)

The present invention relates to new and novel 10-bromoyohimbine alkaloids having the formula:

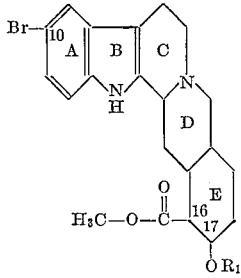

wherein $R_1$ is hydrogen, the acyl radical of an aliphatic carboxylic acid containing 1 to 6 carbon atoms, benzoyl or benzoyl nuclearly substituted with 1, 2 or 3 lower alkyl, lower alkoxy or halo groups, and to the non-toxic pharmaceutically acceptable acid addition and quaternary ammonium salts thereof. This invention also relates to a new and novel method of preparing the above compounds.

The new and novel compounds of this invention have interesting and significant pharmacological activity in inhibiting the effect of epinephrine and norephinephrine upon blood pressure. In addition, they are valuable intermediates in the production of other alkaloids of the yohimbane series.

The compounds of this invention bear the A, B, C, D and E rings as depicted in the above structural formula and are generally, 10-brominated derivatives of alkaloids of the yohimbine series. Depending upon the configuration of the hydrogen atom at the 3-position and the existence of cis or trans fusion of the D and E rings, four different configurations are possible, that is yohimbane, 3-epiyohimbane, alloyohimbane and 3-epialloyohimbane. The present invention includes within its scope derivatives of these four families of alkaloids bearing substituents at the 10, 16 and 17 positions as indicated in the above formula.

The starting materials for the production of the compounds of our invention have the formula:

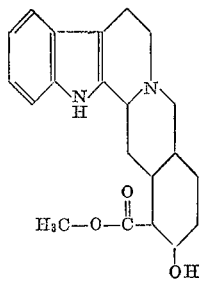

the above formula representing the known alkaloids yohimbine, 3-epiyohimbine, alloyohimbine and 3-epialloyohimbine.

We have now found that the treatment of starting materials of the above formula with bromine in the presence of glacial acetic acid and an inert solvent such as ether, methanol or tetrahydrofuran or mixtures thereof at a temperature of less than —40° C. yields compounds of the formula

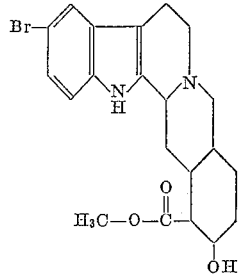

The product may be precipitated from the reaction mixture by the addition of ether and then purified by partitioning between chloroform and aqueous ammonium hydroxide followed by crystallization of the solids recovered from the chloroform extract.

We have also found that esterification of the above 10-bromoyohimbine alkaloids in accordance with conventional esterification procedures yields esters of the formula

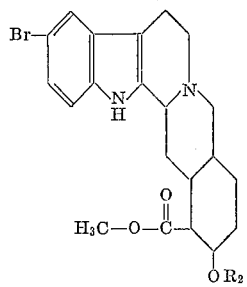

wherein $R_2$ is the acyl radical of an aliphatic carboxylic acid containing 1 to 6 carbon atoms, benzoyl or benzoyl nuclearly substituted with 1 to 3 lower alkyl, lower alkoxy or halo groups. Esterification with an acid anhydride of the formula $(R_2)_2O$ or an acid chloride of the formula $R_2Cl$ in the presence of anhydrous pyridine is effective.

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicyclic, malic, cinnamic, hydrochloric, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

EXAMPLE 1

*10-Bromoyohimbine*

A solution of 123 g. yohimbine in a mixture of 500 ml.

glacial acetic acid, 500 ml. tetrahydrofuran, and 1200 ml. absolute ether is cooled to −50° to −55° and a solution of 56 g. bromine in 80 ml. glacial acetic acid is added dropwise with stirirng over a period of about 45 minutes. The mixture is stirred for an additional 15 minutes and 2200 ml. absolute ether are added. The solid which separates is collected, washed with ether, and stirred at room temperature with 300 ml. methanol. The insoluble solid is filtered off, reluxed with 300 ml. methanol, filtered while hot, and washed on the filter with hot methanol. The washed solid is partitioned between chloroform and aqueous ammonium hydroxide solution and the aqueous layer is extracted further with chloroform. The combined chloroform solutions are dried over sodium sulfate and then distilled invacuo to dryness. The residue is crystallized twice from benzene to give 53 g. of product, M.P. 164–166° dec., $[\alpha]_D^{25}$ +107° (pyridine, c.=0.86). Further recrystallization from benzene yields 10-bromoyohimbine M.P. 169–171° dec., $[\alpha]_D^{25}$ +102° (pyridine, c.=.68).

*Analysis.*—Calc.: C, 58.20; H, 5.82; N, 6.46; Br, 18.44. Found: C, 58.42; H, 6.00; N, 6.64; Br, 18.59.

The hemicitrate salt of 10-bromoyohimbine recrystallized from ethanol has a melting point of 185–187° dec. (sinters at 172°) and an $[\alpha]_D^{25}$ +81° (pyridine, c.=0.67), $[\alpha]_D^{25}$ +84° (5 N acetic acid, c.=0.63).

*Analysis.*—For 10-bromoyohimbine hemicitrate as the hemiethanolate.—Calc.: C, 54.35; H, 5.84; N, 5.07; Br, 14.47. Found: C, 54.22; H, 6.13; N, 5.20; Br, 14.79.

EXAMPLE 2

10-Bromoyohimbine Acetate

A solution of 10 g. 10-bromoyohimbine and 30 ml. acetic anhydride in 60 ml. dry pyridine is allowed to stand at room temperature for 24 hours. Most of the pyridine is removed by distillation in vacuo and the residue is partitioned between aqueous ammonium hydroxide and chloroform. The chloroform solution is dried over sodium sulfate and distilled in vacuo to dryness and the residue is recrystallized from methanol to give 8 g. of crystals, M.P. 263–268° dec., $[\alpha]_D^{25}$ +57° (pyridine, c.=0.6). Recrystallization from methanol gives 10-bromoyohimbine acetate, M.P. 264–266° dec., $[\alpha]_D^{25}$ +51° (pyridine, c.=0.61).

*Analysis.*—Calc.: C, 58.11; H, 5.73; N, 5.89; Br, 16.81. Found: C, 58.18; H, 5.83; N, 6.06; Br, 16.99.

In the foregoing examples, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

1. A member selected from the group consisting of compounds of the formula:

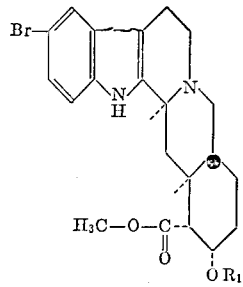

wherein $R_1$ is a member selected from the group consisting of hydrogen, the acyl radical of an unsubstituted saturated aliphatic carboxylic acid of 1 to 6 carbon atoms, benzoyl and benzoyl nuclearly substituted with 1 to 3 members selected from the group consisting of lower alkyl, lower alkoxy and halo, and the nontoxic pharmaceutically acceptable acid addition salts thereof.

2. 10-bromoyohimbine.
3. 10-bromoyohimbine acetate.

References Cited in the file of this patent
UNITED STATES PATENTS 2,912,436   Weisenborn _____ Nov. 10, 1959

OTHER REFERENCES

Barger et al.: Jour. Chem. Soc. of London, vol. 107 (1915), pages 1026 and 1027.

Gall et al.: J. Org. Chem., vol. 20 (1955), page 1541.